(12) United States Patent
Pierce et al.

(10) Patent No.: US 8,215,906 B2
(45) Date of Patent: Jul. 10, 2012

(54) VARIABLE TIP SPEED RATIO TRACKING CONTROL FOR WIND TURBINES

(75) Inventors: Kirk Gee Pierce, Simpsonville, SC (US); Brandon Shane Gerber, Ware Shoals, SC (US); Stefan Herr, Greenville, SC (US)

(73) Assignee: General Electric Company, Schenectady, NY (US)

( * ) Notice: Subject to any disclaimer, the term of this patent is extended or adjusted under 35 U.S.C. 154(b) by 1003 days.

(21) Appl. No.: 12/040,837

(22) Filed: Feb. 29, 2008

(65) Prior Publication Data

US 2009/0220340 A1    Sep. 3, 2009

(51) Int. Cl.
*F01D 7/00* (2006.01)
(52) U.S. Cl. ........... 416/1; 416/27; 416/41; 416/44; 416/30
(58) Field of Classification Search ............ 416/1, 27, 416/30, 40, 41, 43, 44; 290/44, 55
See application file for complete search history.

(56) References Cited

U.S. PATENT DOCUMENTS

| | | | | |
|---|---|---|---|---|
| 4,160,170 A * | 7/1979 | Harner et al. | ............. | 290/44 |
| 4,161,658 A * | 7/1979 | Patrick | ............. | 290/44 |
| 4,193,005 A * | 3/1980 | Kos et al. | ............. | 290/44 |
| 4,656,362 A * | 4/1987 | Harner et al. | ............. | 290/44 |
| 5,213,470 A | 5/1993 | Lundquist | | |
| 5,599,168 A | 2/1997 | Lund | | |
| 6,619,918 B1 * | 9/2003 | Rebsdorf | ............. | 416/1 |
| 7,118,338 B2 | 10/2006 | Moroz et al. | | |
| 7,121,795 B2 | 10/2006 | Moroz et al. | | |
| 7,445,431 B2 * | 11/2008 | Larsen et al. | ............. | 416/1 |
| 7,982,327 B2 * | 7/2011 | Arinaga et al. | ............. | 290/44 |
| 2003/0077178 A1 | 4/2003 | Stearns | | |
| 2004/0067134 A1* | 4/2004 | Beauchamp et al. | ............. | 416/37 |
| 2004/0197186 A1 | 10/2004 | Wobben | | |
| 2005/0200134 A1 | 9/2005 | Shibata et al. | | |
| 2006/0002794 A1* | 1/2006 | Moroz et al. | ............. | 416/48 |
| 2006/0145483 A1 | 7/2006 | Larsen et al. | | |
| 2006/0208493 A1 | 9/2006 | Harbourt et al. | | |

OTHER PUBLICATIONS

Stoddard, F., Nelson, V., Starcher, K., Andrews, B. (1989) "Determination of Elastic Twist in Horizontal Axis Wind Turbines", AEI, West Texas State University, SERI Cntr. RL-6-06013, NREL, Golden, CO., pp. 69, 103-104.*
"Technical Data—Carter Wind Turbine Model 300", www.carterwindenergy.com/technology.html.*
Paul S. Veers and Donald W. Lobitz, Load Attenuating Passively Adaptive Wind Turbine Blade, US H2057 H, Jan. 7, 2003, Sandia Corporation, Albuquerque, NM.

* cited by examiner

*Primary Examiner* — Edward Look
*Assistant Examiner* — Christopher R Legendre
(74) *Attorney, Agent, or Firm* — McNees Wallace & Nurick LLC

(57) ABSTRACT

The present invention relates to a method of controlling the aerodynamic load of a wind turbine blade by controlling the tip speed ratio (TSR) and/or blade pitch setting of the wind turbine blade so as to optimize power production. A wind turbine blade undergoes an aero-elastic response including deflection and twist that is a function of the blade loading. The blade loading is dependent on the wind speed, TSR, and pitch setting. The aero-elastic response requires a different TSR and/or pitch to be selected throughout the power curve in order to maintain the optimum power production and to improve energy capture.

5 Claims, 5 Drawing Sheets

VARIABLE TIP SPEED RATIO TRACKING CONTROL FOR WIND TURBINES

FEDERALLY SPONSORED RESEARCH

This invention was made with Government support under subcontract ZAM-4-31235 under Prime Contract #DE-AC36-99GO10337 awarded by DOE. The Government has certain rights in this invention.

FIELD OF THE INVENTION

The present invention is directed generally to wind turbines, and more particularly to a method for increasing energy capture and controlling the tip speed ratio and/or blade pitch of a wind turbine blade.

BACKGROUND OF THE INVENTION

Recently, wind turbines have received increased attention as environmentally safe and relatively inexpensive alternative energy sources. With this growing interest, considerable efforts have been made to develop wind turbines that are reliable and efficient.

Generally, a wind turbine includes a rotor having multiple blades. The rotor is mounted to a housing or nacelle, which is positioned on top of a truss or tubular tower. Utility grade wind turbines (i.e., wind turbines designed to provide electrical power to a utility grid) can have large rotors (e.g., 30 or more meters in length). In addition, the wind turbines are typically mounted on towers that are at least 60 meters in height. Blades on these rotors transform wind energy into a rotational torque or force that drives one or more generators that may be rotationally coupled to the rotor through a gearbox. The gearbox steps up the inherently low rotational speed of the turbine rotor for the generator to efficiently convert mechanical energy to electrical energy, which is fed into a utility grid.

Wind turbine blades have continually increased in size in order to increase energy capture. However, as blades have increased in size, it has become increasingly more difficult to control optimum energy capture. As wind turbine blades grow larger, they undergo an increased aero-elastic response including deflection and twist when loaded that can negatively impact the energy capture. Additionally, turbine blades may be designed to have an aero-elastic response, with the twist of the blade dependent on the loading upon the blade. The blade loading is dependent on the wind speed, tip speed ratio (TSR) and/or pitch setting of the blade. TSR is the ratio of the rotational velocity of the blade tip to wind speed. It is important to optimize the operation of the wind turbine, including blade energy capture, to reduce the cost of the energy produced.

Therefore, what is needed is a method for operating a wind turbine that optimizes energy capture by controlling the TSR and blade pitch angle for the current operating condition.

SUMMARY OF THE INVENTION

A first embodiment of the present invention includes a method for controlling a wind turbine having twist bend coupled rotor blades on a rotor mechanically coupled to a generator. The method includes determining a speed of a rotor blade tip of the wind turbine and adjusting a torque of a generator to change the speed of the rotor blade tip to thereby increase an energy capture power coefficient of the wind turbine.

Another aspect of the present invention includes a method for controlling a wind turbine having twist bend coupled rotor blades on a rotor mechanically coupled to a generator, the method including determining wind speed and adjusting blade pitch to thereby increase an energy capture power coefficient of the wind turbine.

Other features and advantages of the present invention will be apparent from the following more detailed description of the preferred embodiment, taken in conjunction with the accompanying drawings which illustrate, by way of example, the principles of the invention.

DETAILED DESCRIPTION OF THE INVENTION

Figure 1:
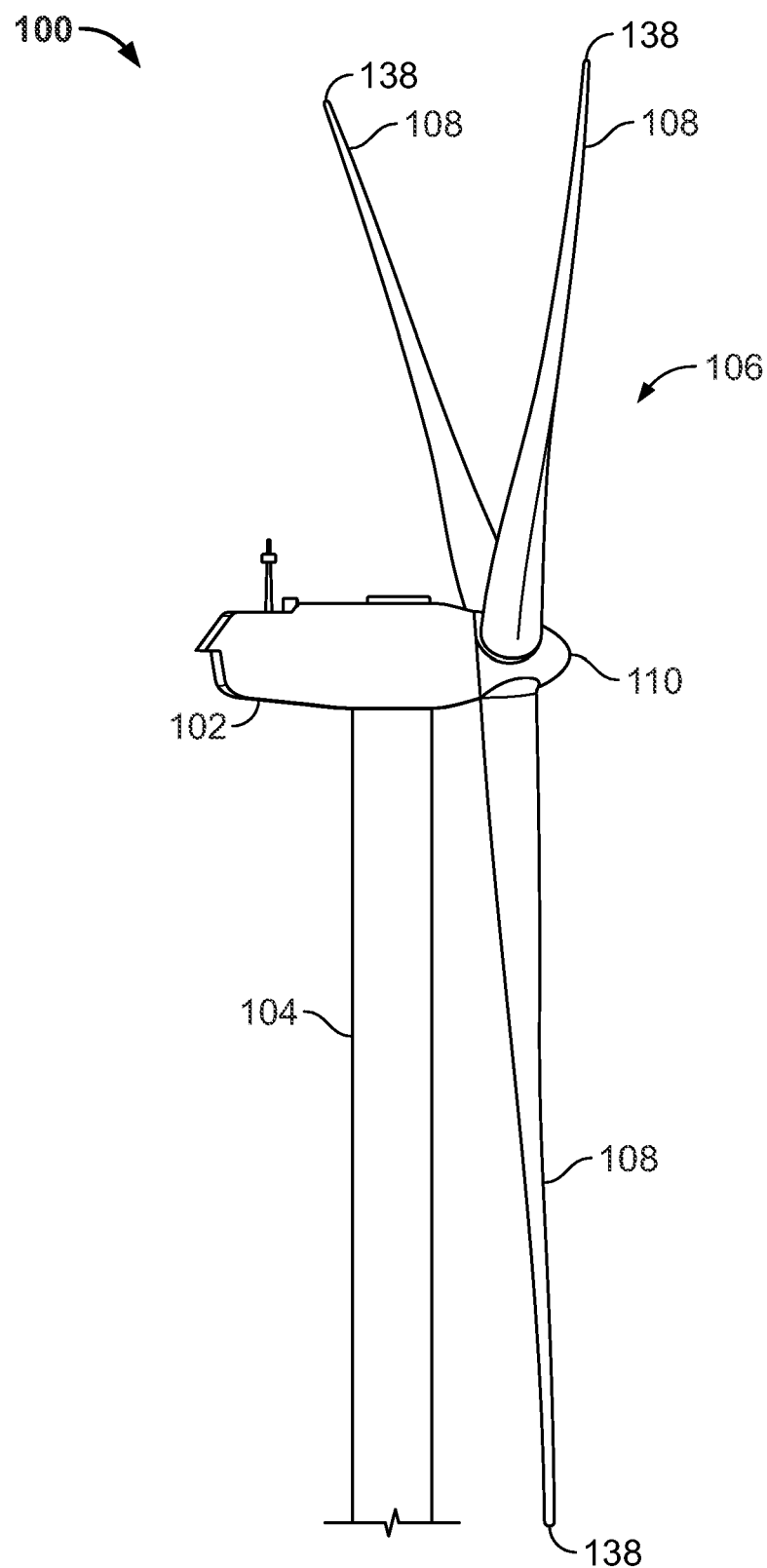
FIG. 1 is an illustration of an exemplary configuration of a wind turbine.

Referring to FIG. 1, an exemplary wind turbine 100 according to the present invention is disclosed. The wind turbine 100 includes a nacelle 102 mounted atop a tall tower 104, only a portion of which is shown in FIG. 1. Wind turbine 100 also comprises a wind turbine rotor 106 that includes one or more rotor blades 108 attached to a rotating hub 110. Although wind turbine 100 illustrated in FIG. 1 includes three rotor blades 108, there are no specific limits on the number of rotor blades 108 required by the present invention. The height of tower 104 is selected based upon factors and conditions known in the art.

Figure 2:
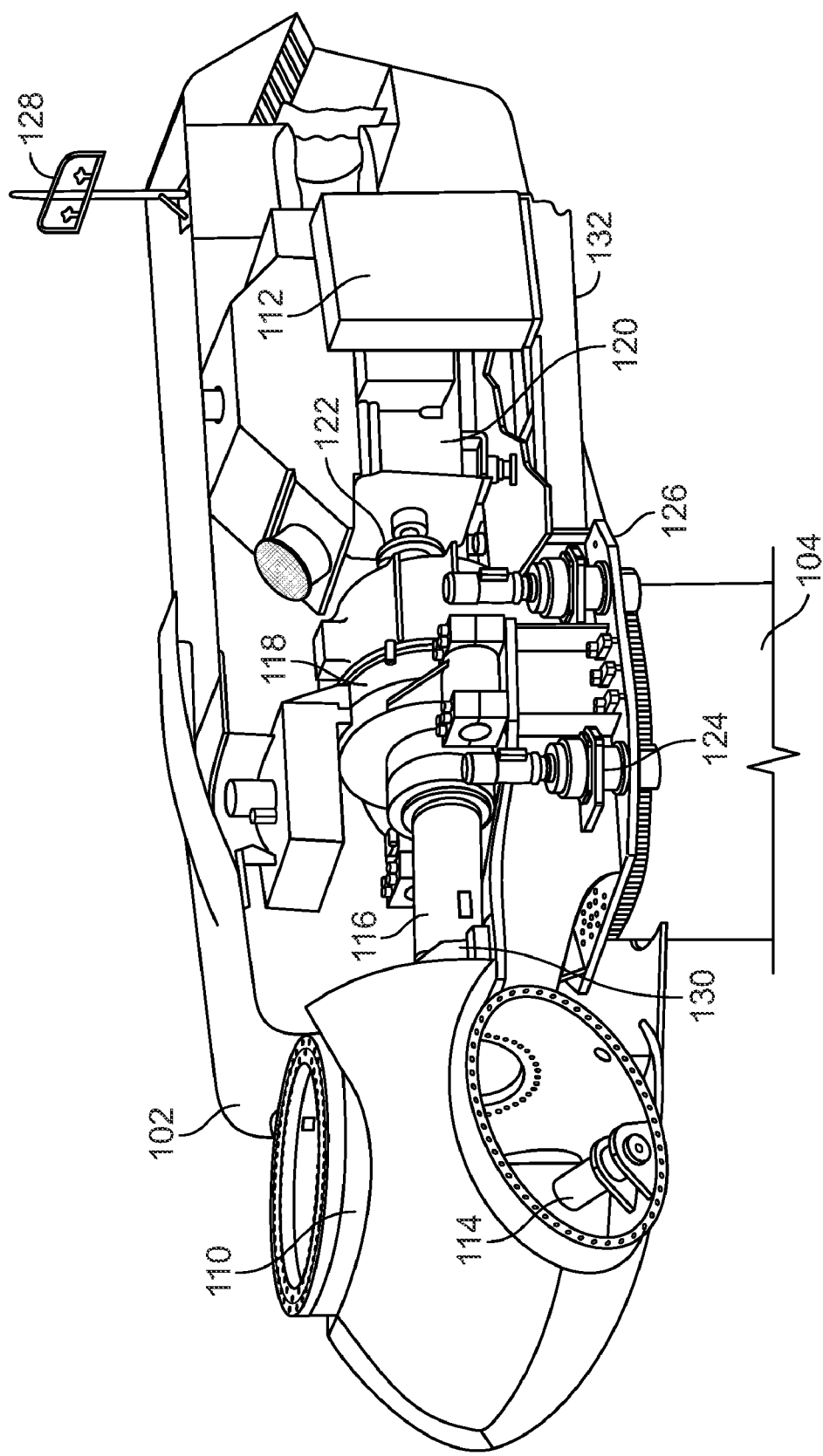
FIG. 2 is a cut-away perspective view of a nacelle of the exemplary wind turbine configuration shown in FIG. 1.

In some configurations and referring to FIG. 2, various components are housed in nacelle 102 atop tower 104. One or more microcontrollers (not shown) are housed within control panel 112. The microcontrollers include hardware and software configured to provide a control system providing overall system monitoring and control, including pitch and speed regulation, high-speed shaft and yaw brake application, yaw and pump motor application and fault monitoring. In alternative embodiments of the disclosure, the control system may be a distributed control architecture not solely provided for by the control panel 112 as would be appreciated by one of ordinary skill in the art. The control system provides control signals to a variable blade pitch drive 114 to control the pitch of blades 108 (FIG. 1) that drive hub 110 as a result of wind. In some configurations, the pitches of blades 108 are individually controlled by blade pitch drive 114.

The drive train of the wind turbine includes a main rotor shaft 116 (also referred to as a "low speed shaft") connected to hub 110 and supported by a main bearing 130 and, at an opposite end of shaft 116, to a gear box 118. Gear box 118, in some configurations, utilizes a dual path geometry to drive an enclosed high speed shaft. The high speed shaft (not shown in FIG. 2) is used to drive generator 120, which is mounted on main frame 132. In some configurations, rotor torque is transmitted via coupling 122. Generator 120 may be of any suitable type, for example, a wound rotor induction generator.

Yaw drive 124 and yaw deck 126 provide a yaw orientation system for wind turbine 100. Anemometry provides information for the yaw orientation system, including measured instantaneous wind direction and wind speed at the wind turbine. Anemometry may be provided by a wind vane 128. In some configurations, the yaw system is mounted on a flange provided atop tower 104.

Figure 3:
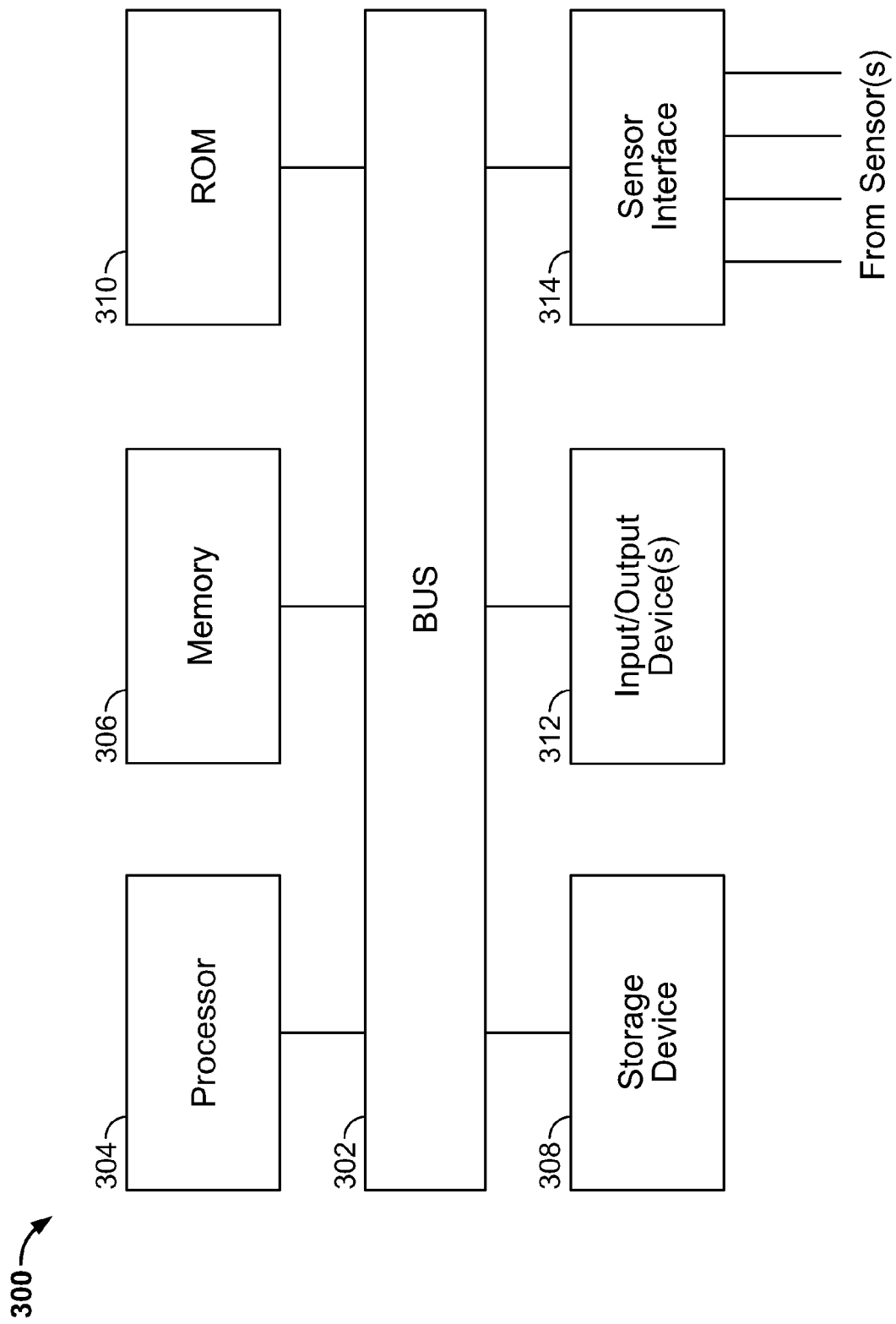
FIG. 3 is a block diagram of an exemplary configuration of a control system for the wind turbine configuration shown in FIG. 1.

In some configurations and referring to FIG. 3, an exemplary control system 300 for wind turbine 100 includes a bus 302 or other communications device to communicate information. Processor(s) 304 are coupled to bus 302 to process information, including information from sensors configured to measure displacements or moments. Control system 300 further includes random access memory (RAM) 306 and/or other storage device(s) 308. RAM 306 and storage device(s) 308 are coupled to bus 302 to store and transfer information and instructions to be executed by processor(s) 304. RAM 306 (and also storage device(s) 308, if required) can also be used to store temporary variables or other intermediate information during execution of instructions by processor(s) 304. Control system 300 can also include read only memory (ROM) and or other static storage device 310, which is coupled to bus 302 to store and provide static (i.e., non-changing) information and instructions to processor(s) 304. Input/output device(s) 312 can include any device known in the art to provide input data to control system 300 and to provide yaw control and pitch control outputs. Instructions are provided to memory from a storage device, such as magnetic disk, a read-only memory (ROM) integrated circuit, CD-ROM, DVD, via a remote connection that is either wired or wireless providing access to one or more electronically-accessible media, etc. In some embodiments, hard-wired circuitry can be used in place of or in combination with software instructions. Thus, execution of sequences of instructions is not limited to any specific combination of hardware circuitry and software instructions. Sensor interface 314 is an interface that allows control system 300 to communicate with one or more sensors. Sensor interface 314 can be or can comprise, for example, one or more analog-to-digital converters that convert analog signals into digital signals that can be used by processor(s) 304.

A method and system for controlling a wind turbine having twist bend coupled rotor blades on a rotor mechanically coupled to a generator includes determining a speed of a rotor blade tip of the wind turbine, measuring a current twist distribution and current blade loading, and adjusting a torque of a generator to change the speed of the rotor blade tip to thereby increase and energy capture power coefficient of the wind turbine is disclosed in U.S. Pat. No. 7,118,338 B2, which is hereby incorporated by reference in the entirety.

Figure 4:
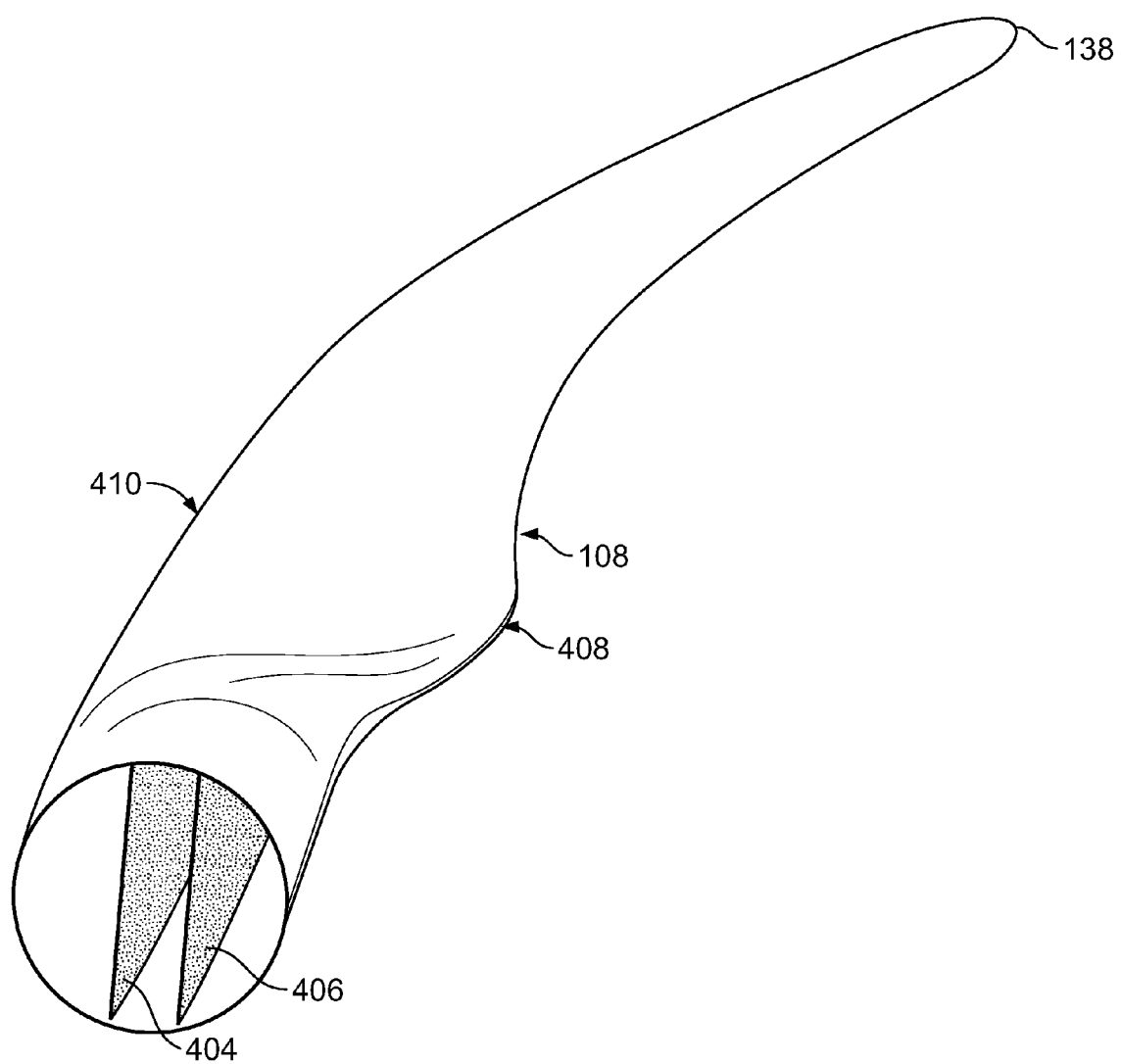
FIG. 4 is a perspective view of a swept rotor blade having passive twist-bend coupling and two shear webs.

In some configurations of the present invention, an aero-elastic blade is provided that changes its aerodynamic twist as it is loaded. For example and referring to FIG. 1 and FIG. 4, a rotor blade 108 is provided having a passive aero-elastic response and one or more shear webs (for example, two shear webs 404 and 406). An optimum pitch setting for maximum energy capture varies in wind turbines 100 having blades 108 with an aero-elastic response. However, to avoid loss of energy capture, the tip speed ratio and blade pitch angle are tracked and varied for maximum or at least favorable power coefficient by adjusting rotor 106 speed (i.e., rotation rate) and blade pitch angle through actuators 114. In some configurations, this adjustment is made by using optical sensors (not shown) or any other suitable sensors to measure rotational speed as rotor 106 rotates.

In some configurations, hub rotational speed is known from an encoder on a high speed shaft connected to the aft end of the generator, and blade length, which is known, is used to determine tip speed. This tip speed data is received by control system 300, which utilizes a table or equation that relates generator 120 torque to an optimum or at least favorable tip speed ratio (TSR), which is the ratio of rotational speed of the blade tip to wind velocity, for the current twist distribution occurring at the current blade loading. The equation or table can be empirically determined or calculated using known physical laws. Control system 300 controls generator 120 torque in accordance to the equation or table to produce a rotor 106 speed that provides the optimum or at least a favorable power coefficient. This technique can be used to augment a below-rated pitch schedule or used alone to restore energy capture to levels closer to the entitlement associated with an uncoupled blade.

Figure 5:
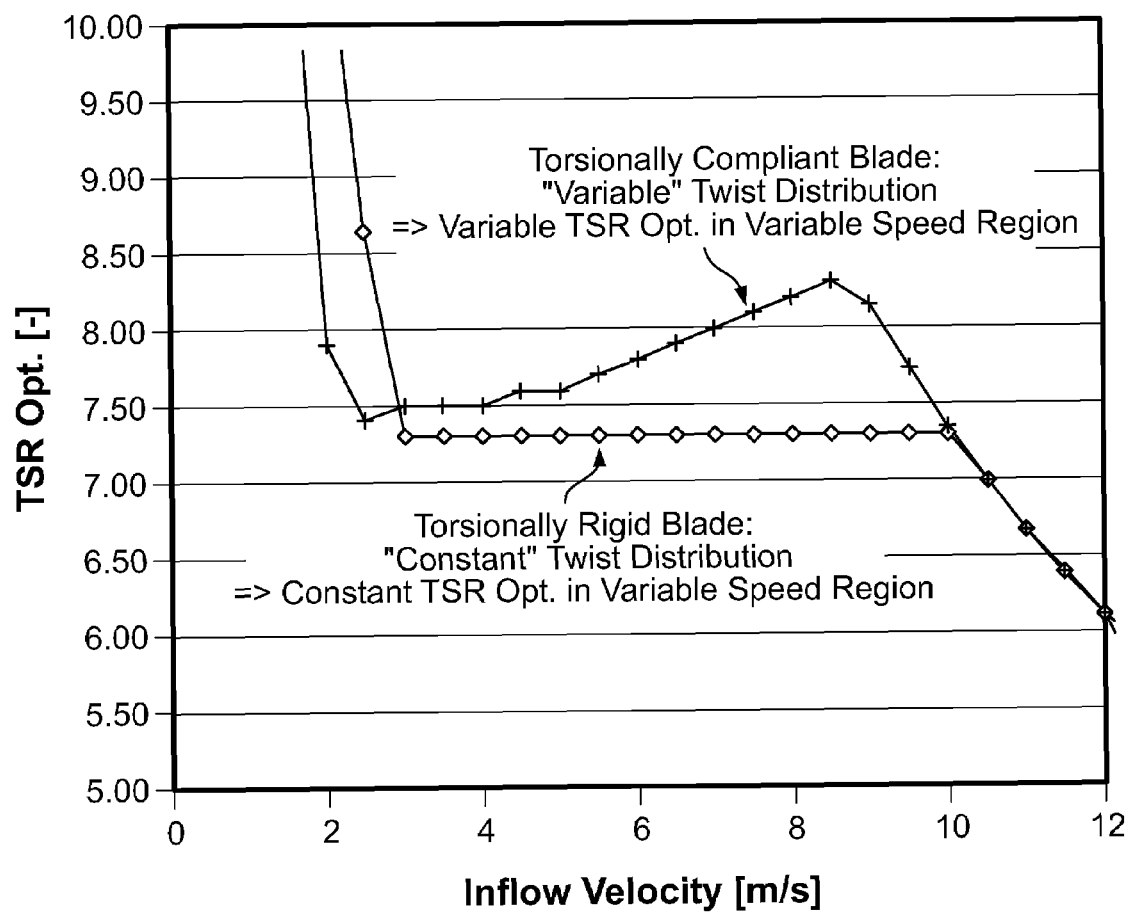
FIG. 5 is a comparison of the optimum tip speed ratio for a torsionally rigid blade and a torsionally compliant blade as a function of wind speed.

In order to maintain the optimum power production and improve energy capture, a different TSR and/or pitch setting is required throughout the variable speed region of the power curve below rated wind speed as shown in FIG. 5. As can be seen in FIG. 5, tracking a variable TSR and pitch setting below rated wind allows the turbine to operate at a point that minimizes the impact of the deflection and twist that the blade undergoes during operation.

For standard turbine operation, with blades that undergo minimum aero-elastic deformation, only one TSR may be tracked at a selected pitch setting to maintain a maximum power coefficient. The rotational speed of the wind turbine rotor is measured and the torque of the generator is adjusted to maintain efficient energy capture of the wind turbine. The rotational speed of the wind turbine may be measured at the blade, hub, or shaft as would be appreciated by one of ordinary skill in the art.

For a turbine equipped with blades that undergo an aero-elastic response, the pitch setting and TSR for maximum energy capture varies with wind speed and resulting blade loading. To maintain optimum energy capture, the pitch angle of the blades and the torque of the generator are varied for the current turbine operating condition to provide the optimum or at least favorable energy capture. The control system controls the generator torque and pitch setting in accordance to an equation or table relating generator torque and blade pitch to rotational speed, which results in turbine operation at the optimum or at least favorable power coefficient. This technique can be used to define the below-rated pitch and torque schedule. The method could similarly be accomplished through measurements of wind speed, blade loading, and/or power, for example by measuring the wind speed and setting the desired blade pitch and generator torque.

While the invention has been described with reference to a preferred embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A method for controlling a wind turbine having torsionally compliant blades driving a variable speed rotor mechanically coupled to a generator, the torsionally compliant blades having an induced twist larger than one degree at or below rated power, the method comprising:

measuring a tip speed ratio and a blade pitch of the torsionally compliant blades at or below rated power;

measuring a twist distribution and a blade loading of the torsionally compliant blades at or below rated power;

comparing the measured tip speed ratio and blade pitch at the measured twist distribution and blade loading to determine a below-rated power pitch and generator torque schedule; and adjusting generator torque, blade pitch, or a combination thereof in response to the below-rated power pitch and generator torque schedule, the adjusting providing increased energy capture of the wind turbine.

2. The method of claim 1, wherein comparing includes:

utilizing a table or equation relating a tip speed ratio for a current twist distribution and current blade loading to any one of generator torque, blade pitch, power, or any combination thereof to adjust either the generator torque or blade pitch.

3. The method of claim 1, wherein comparing includes:

utilizing a table or an equation relating rotational speed for a current twist distribution and current blade loading to any one of generator torque, blade pitch, power or any combination thereof to adjust either the generator torque or blade pitch.

4. A method for controlling a wind turbine having torsionally compliant blades driving a variable speed rotor mechanically coupled to a generator, the torsionally compliant blades having an induced twist larger than one degree at or below rated power, the method comprising:

measuring blade loading and blade pitch of the torsionally compliant blade at or below rated power;

comparing the measured blade loading and blade pitch to an optimal rotational speed of the torsionally compliant blade at or below rated power; and adjusting rotational speed, generator torque, or combination thereof, in response to the measured blade loading and blade pitch to implement the optimal rotational speed of the torsionally compliant blade at or below rated power, the adjusting providing increased energy capture of the wind turbine.

5. The method of claim 4, wherein comparing includes:

utilizing a table or an equation relating blade loading and blade pitch for a current twist distribution to any one of rotational speed and power, rotational speed and torque, power and tip speed ratio, or torque and tip speed ratio to adjust either the generator torque or blade pitch.

* * * * *